United States Patent [19]

Fernsler et al.

[11] 4,144,545
[45] Mar. 13, 1979

[54] TELEVISION HORIZONTAL OSCILLATOR FREQUENCY CONTROL ARRANGEMENT FOR USE WITH A TAPE RECORDER

[75] Inventors: Ronald E. Fernsler, Indianapolis; Michael L. Henley, Mooresville, both of Ind.

[73] Assignee: RCA Corporation, New York, N.Y.

[21] Appl. No.: 862,179

[22] Filed: Dec. 19, 1977

[51] Int. Cl.² .............................................. H04N 5/04
[52] U.S. Cl. ................................................... 358/158
[58] Field of Search ................. 358/148, 158, 159, 127

[56] References Cited
U.S. PATENT DOCUMENTS

| | | | |
|---|---|---|---|
| 3,740,489 | 6/1973 | Willis | 358/158 |
| 3,846,584 | 11/1974 | Itoh et al. | 358/158 |

Primary Examiner—Richard Murray
Attorney, Agent, or Firm—Eugene M. Whitacre; Paul J. Rasmussen; William H. Meise

[57] ABSTRACT

A television horizontal oscillator for use with a video source having a step change in the phase of the horizontal synchronizing pulses occurring at the vertical rate uses a phase-lock loop including a low-pass filter having a controllable filter characteristic. The control input of the filter is coupled to a source of vertical deflection rate signals and the filter attenuation is varied at the vertical rate. A delay arrangement including a ramp generator and a comparator delays the variation of the filter characteristic relative to the vertical synchronizing signal.

16 Claims, 2 Drawing Figures

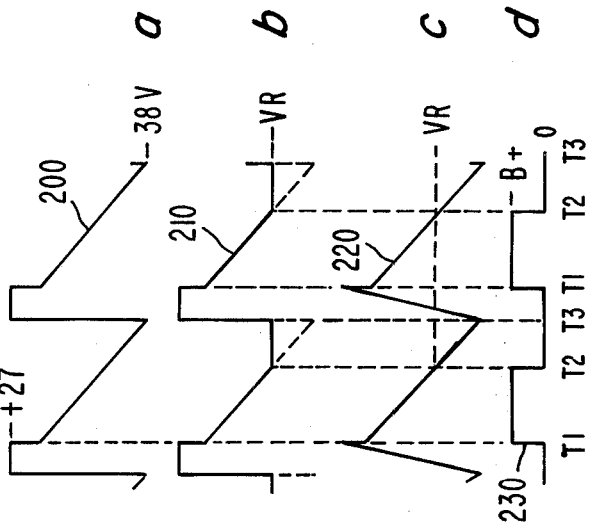
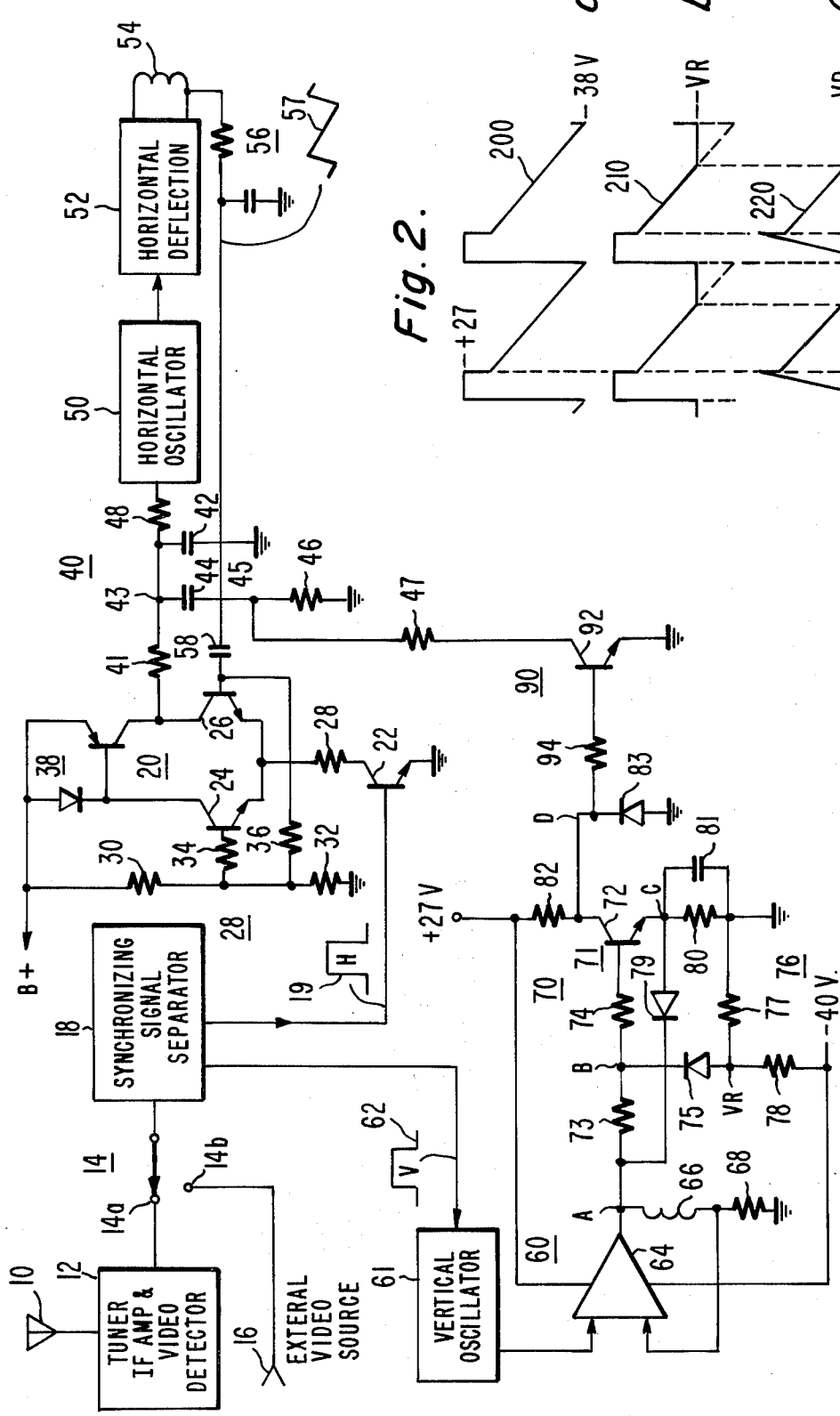
Fig. 2.
Fig. 1.

TELEVISION HORIZONTAL OSCILLATOR FREQUENCY CONTROL ARRANGEMENT FOR USE WITH A TAPE RECORDER

This invention relates to television horizontal oscillator frequency control arrangements and more particularly to phase-lock arrangements by which the horizontal oscillator is synchronized with horizontal synchronizing signals.

The raster of a television display is scanned in the vertical or horizontal directions at a rate controlled by vertical and horizontal synchronizing signals, respectively, which are associated with the video to be displayed. Since the composite video may contain noise components, it is customary to provide the television device with noise immunity in the form of a phase-lock loop, in which a controllable horizontal-frequency oscillator is coupled in a feedback loop with a phase-sensitive detector and a low-pass filter, whereby the phase detector produces pulses representative of the difference in phase between the controlled oscillator and the horizontal synchronizing pulses associated with the video. The pulses produced by the phase detector are filtered by the low-pass filter, the output of which is coupled to the control input of the oscillator, and the oscillator rate is thereby maintained equal to the average synchronizing pulse rate.

It will often be desired to supply the television display device with composite video from a video playback device or tape recorder. Such video tape recorders commonly use a plurality of reproduction heads, each of which is mechanically scanned across the tape. In one common scheme, two heads are used, which alternately scan the type for a duration equal to that of a vertical field. In order to avoid loss of, or breaks in, the displayed information, the succeeding field scanning is commenced by the second head substantially concurrently with the end of scanning in the first head. However, slight differences in tape tension or in the dimensions of the mechanical tape transport acting on the tape during playback compared with the tension and dimensions when the tape was recorded results in differences in the time between succeeding horizontal synchronizing pulses in the information played back as compared with that recorded, especially during the interval in which switchover between the scanning heads occurs. This results in a discontinuity or step in the phase of the horizontal synchronizing pulses available for synchronizing the horizontal oscillator and for controlling the raster. The step in phase normally occurs about five horizontal lines before the end of a vertical scanning interval.

Such a step change of phase will cause the phase-lock loop to control the horizontal oscillator in such a manner as to cause the oscillator phase to change and accommodate itself to the altered phase of the synchronizing signals. However, the gain characteristics of the low-pass filter of the phase-lock loop normally prevents the controlled oscillator from changing at a rate great enough to provide total synchronization between the controlled oscillator and the synchronizing signals before the end of the vertical blanking interval. This may result in a distortion of the displayed video.

U.S. Pat. No. 3,740,489 issued June 19, 1973 in the name of D. Willis describes an external switch by which the user may change the characteristics of the low-pass filter in the phase-lock loop when it is desired to use a tape recorder as the video source. This alters the gain characteristics of the phase-lock loop, allowing the oscillator to change phase or to slew towards the new phase at a greater rate. However, the user may forget to throw the switch, thereby permitting the aforementioned video distortion, or may forget to return the switch to its normal condition when receiving transmitted or broadcast signals, which will make the television receiver horizontal sychronization more sensitive to noise.

It is also known from U.S. Pat. No. 3,846,584, issued on Nov. 9, 1974, in the name of Itoh, et al., to completely disconnect the low-pass filter from the phase-lock loop for a predetermined limited period of time following the appearance of the vertical sychronizing signal. With such an arrangement, the display may be distorted for the last few lines of video when a phase discontinuity occurs prior to the vertical synchronizing signal, and the phase-lock loop may have insufficient time in which to complete slewing of the horizontal oscillator to the new phase before the end of the vertical blanking interval and the beginning of the succeeding period of video display. While the slew rate may be increased by increasing the loop gain, this may result in a "scalloping" distortion of vertical lines near the top of the vertical scan resulting from excessive phase-lock loop gain.

SUMMARY OF THE INVENTION

A television horizontal oscillator sychronizing arrangement for synchronizing a horizontal oscillator with a source of synchronizing signals which may have a step change in phase occurring at the vertical deflection rate includes a controllable oscillator for producing horizontal rate signals with controllable frequency and phase. A horizontal deflection arrangement is coupled to the horizontal rate oscillator and promotes the flow of deflection current in sychronism with the oscillations. A phase detector has one input coupled to the horizontal deflection circuit and another coupled to the source of horizontal synchronizing pulses and produces control signals representative of the phase difference between the two. A filter having a controllable frequency-amplitude characteristic is coupled to the output of the phase detector and to an input of the controllable oscillator. The controllable filter averages the control signals. A vertical deflection arrangement is coupled to a source of vertical deflection rate synchronizing signals for producing a recurrent ramp signal in sychronism therewith. A threshold circuit is coupled to the vertical deflection circuit and to the frequency-amplitude control input of the controllable filter for varying the frequency-amplitude characteristics of the controllable filter at a time delayed with respect to the vertical rate synchronizing signals.

DESCRIPTION OF THE DRAWINGS

FIG. 1 is a diagram partially in block and partially in schematic form of a portion of a television receiver embodying the invention; and FIG. 2 illustrates vertical-rate voltage-time waveforms occurring in the arrangement of FIG. 1 during operation.

DESCRIPTION OF THE INVENTION

FIG. 1 illustrates a portion of a television receiver adapted to receiving transmitted signals in addition to signals from an external video source. In FIG. 1, an antenna 10 is arranged to receive transmitted television signals modulated onto a carrier. A tuner, IF amplifier and video detector arrangement 12 is coupled to antenna 10 and is adapted to recovering composite video modulation from the transmitted signal. The video is made available at a terminal 14a of a selector switch 14. An external video jack 16 is coupled to terminal 14b of switch 14. Video selected by switch 14 is applied to an input of a sychronizing signal separator 18. Separator 18 separates horizontal synchronizing pulses illustrated as waveform 19 from the composite video and applies them to the base of transistor 22, which forms one input of a phase-sensitive detector designated generally as 20. Phase detector 20 includes emitter-coupled transistors 24 and 26, the emitters of which are coupled to the collector of transistor 22 by a resistor 28. The bases of transistors 24 and 26 receive a direct biasing voltage from a resistive voltage divider designated generally as 28 coupled between B+ and ground, and including resistors 30 and 32. The bases of transistors 24 and 26 are coupled to the tap on voltage divider 28 by resistors 34 and 36, respectively. A current mirror designated generally as 38 has an input coupled to the collector of transistor 24 and an output coupled to the collector of transistor 26 for forming a high-impedance output terminal of phase comparator 20 at the collector of transistor 26. The output of comparator 20 is coupled to the input of a filter 40 comprising resistor 41 and a high-frequency rolloff capacitor 42 coupled between the filter input and ground and having a junction 43 therebetween. Filter 40 also includes the serial combination of a low-frequency averaging capacitor 44 and a resistor 46 having a junction 45 therebetween, the serial combination being coupled between junction 43 and ground. Filter 40 also includes an impedance setting resistor 48 coupled from junction 43 to a low-impedance input of a horizontal oscillator 50.

Horizontal oscillator 50 has its frequency and phase controlled by the input from filter 40, and produces horizontal-rate pulses which are applied to a horizontal deflection circuit illustrated as block 52, which promotes the flow of deflection current in a horizontal deflection winding 54 associated with a kinescope, not shown. The deflection voltage resulting from the flow of deflection current in deflection winding 54 is applied to an integrator, designated generally as 56, coupled to horizontal deflection circuit 52. Integrator 56 forms horizontal-rate sawtooth voltages illustrated as waveform 57 from the pulsatory deflection voltage and applies them to the base of transistor 26 of phase detector 20 through a coupling capacitor 58. Sawtooth voltages 57 are compared with the horizontal synchronizing pulses in phase detector 20, which responds with current pulses representing the frequency and phase differences between sawtooth voltages 57 and horizontal synchronizing pulses 19.

Synchronizing signal separator 18 also separates vertical synchronizing signals illustrated as 62 from the composite video selected by switch 14. The vertical synchronizing signals are applied to a vertical oscillator 61 of a vertical deflection circuit designated generally as 60. Vertical oscillator 61 produces ramp signals at the vertical deflection rate. The vertical ramp signals are applied to an input of a vertical deflection amplifier 64, which responds thereto and produces a recurrent sawtooth waveform illustrated as 200 of FIG. 2a at an output point or terminal A. The sawtooth waveform is impressed across a vertical deflection winding 66 associated with the kinescope, and promotes the flow of deflection current in the deflection winding. A current sensing resistor 68 is coupled in series with deflection winding 66, and produces a control voltage proportional to the deflection current, which control voltage is fed back to an input of amplifier 64 in a degenerative manner.

Deflection voltage 200 at point A is also applied to the input of a threshold circuit designated generally as 70. Threshold circuit 70 includes a reference voltage divider designated generally as 76 and including resistors 77 and 78 serially coupled between the −40 volt supply and ground, thereby establishing a reference voltage VR at the tap of the divider. Threshold circuit 70 also includes a comparator designated generally as 71 which compares the sawtooth voltage at point A with the reference voltage and produces a control signal in response thereto at an output terminal D. Comparator 71 includes a transistor 72 having a current limiting resistor 74 coupled in series with its base. The end of resistor 74 remote from the base of transistor 72 is coupled to a point B, and point B is connected to output terminal A of amplifier 64 by a resistor 73. A diode 75 has its anode coupled to the tap of divider 76 and its cathode coupled to point B, thereby preventing point B from decreasing to a voltage significantly more negative than the reference voltage. Terminal A is also coupled to the emitter of transistor 72 at a terminal C by a diode 79. The emitter of transistor 72 is coupled to ground by the parallel arrangement of a resistor 80 and capacitor 81. The collector of transistor 72 is coupled to a positive 27 volt supply by a load resistor 82. The collector of transistor 72 is also coupled to ground by the cathode-anode path of a diode 83, which prevents the collector of transistor 72 from dropping to a voltage significantly more negative than ground. The cathode of diode 83 forms output terminal D of comparator 71.

Output terminal D of comparator 71 is coupled to the base of transistor 92 by means of a series resistor 94. The emitter of transistor 92 is grounded, and the collector of transistor 92 is coupled to point 45 of filter 40 by a resistor 47. Transistor 92, resistor 94 and resistor 47 form the variable portion 90 by which resistor 47 may be coupled in parallel with resistor 46 to change the frequency-amplitude characteristics which filter 40 presents to the phase detector control signal, without perturbing the averaged filter voltage at the time the change occurs. Generally speaking, filter 40 alternates high-frequency components of the output of phase detector 20 relative to low-frequency components.

In operation during the principal portion of the vertical scanning interval, deflection voltage 200 significantly exceeds the reference voltage, diode 75 is nonconductive, and diode 79 is conductive as decreasing voltage 200 at point A is applied to capacitor 81. With diode 79 conductive, and diode 75 nonconductive, the base-emitter junction of transistor 72 is back-biased and the transistor is nonconductive. The voltage at output terminal D is at B+ as shown by waveform 230 of FIG. 2d. With the voltage at point D high, transistor 92 is conductive and resistor 47 is coupled in parallel with resistor 46. Sawtooth waveforms 57 are compared with horizontal synchronizing pulses 19 in phase comparator 20, which produces current pulses dependent upon the degree of phase agreement. The current from the output of comparator 20 flows through resistors 41 and 48, producing voltage pulses which are averaged by capacitors 42 and 44 to form a control voltage by which horizontal oscillator 50 is controlled. Depending upon their spectral frequency distribution, the voltage pulses will be attenuated by an amount depending upon the magnitude of the resistance in series with capacitor 44. With resistor 47 paralleling resistor 46, the attenuation of filter 40 within a particular frequency range will be relatively high, so the phase-lock loop gain in that range is low for proper noise immunity.

A few horizontal lines before the end of the vertical scanning interval, at a time $T_2$, just prior to the time at which a step change in phase is expected to occur in the horizontal synchronizing pulses from a video tape recorder, the voltage at point A becomes slightly less than reference voltage VR. This causes diode 75 to become forward biased, with the result that the voltage at point B no longer decreases, as shown by waveform 210 of FIG. 2b. However, the voltage at point C continues to decrease with the voltage at point A as illustrated by waveform 220 of FIG. 2c. As a result, the base-emitter junction of transistor 72 becomes forward-biased, and transistor 72 begins to conduct, with its emitter current flowing through diode 79 together with the current from resistor 80 and capacitor 81. Conduction of transistor 72 at time $T_2$ causes the voltage at comparator output D to decrease sharply, as shown in FIG. 2d. This removes base-emitter bias from transistor 92, which becomes nonconductive, removing resistor 47 from the circuit of filter 40 and reducing the attenuation of the filter to the phase control signals within a particular frequency range. The reduced attenuation of filter 40 results in a higher loop gain for the phase-lock loop.

So long as the deflection voltage at point A continues to decrease, as illustrated by waveform 200 in the interval between times $T_2$ and $T_3$, transistor 72 will continue to conduct and the phase-lock loop gain will remain high. When operating from broadcast signals rather than from a tape playback, there will be no substantial change in the phase in this interval, and the increased loop gain will not effect any change in oscillator 50 operation. When the input is a tape playback, a change in phase may occur a short time after $T_2$. Phase detector 20 detects this change of phase, and the control signals produced by the phase detector cause horizontal oscillator 50 to slew at a rate which is increased by comparison with that of the low-gain condition.

At the end of the vertical scanning interval near time $T_3$, deflection voltage 200 rises sharply to the positive supply voltage. This causes diode 75 to become nonconductive, decoupling point B from the reference voltage, and also causes diode 79 to become nonconductive, leaving a large negative voltage at point C, as shown by waveform 220. With a voltage at point B substantially more positive than the voltage at point C, transistor 72 continues to conduct, maintaining transistor 92 nonconductive. The voltage at point C rises after time $T_3$ as the voltage on capacitor 81 is reduced towards zero. Near time $T_1$, vertical retrace ends and deflection voltage 200 decreases sharply, removing base-emitter bias from transistor 72 and making diode 79 conductive. At time $T_1$, transistor 92 becomes conductive, and remains conductive through substantially the entire following vertical scanning interval to decrease the filter gain and to enhance noise immunity.

The inventive arrangement allows the television receiver to be conditioned for reception of synchronizing signals from a video tape recorder having a step change in phase occurring prior to the vertical blanking interval, while at the same time retaining over substantially the entire vertical scanning interval the noise immunity normally resulting from the use of a phase-locked loop optimized for broadcast signal reception. Operation of a switch by a user is not required, since the described control is continuously in operation during both kinds of reception. As a further advantage, noise components in the video tape recorder occurring during the vertical scanning interval are discriminated against. The greater portion of the delay mechanism is dependent upon the highly stable and well-controlled characteristics of the vertical deflection circuits. Reliability is enhanced and cost reduced by the low parts count of comparator 70 and by the minimum number of active devices used.

Other embodiments of the invention will be apparent to those skilled in the art. Threshold circuit 70 may include any of a number of conventional comparator circuits, and other reference sources and deflection circuits which are known may be used.

In a particular embodiment of the invention, the following component values were found to give satisfactory operation.

| CAPACITORS | FARADS |
|---|---|
| 42 | 4700P |
| 44 | $1.0\mu$ |
| 81 | $0.47\mu$ |
| RESISTORS | KILOHMS |
| 46 | 33 |
| 47 | 3.3 |
| 48 | 130 |
| 73 | 100 |
| 74 | 82 |
| 77 | 27 |
| 78 | 12 |
| 80 | 10 |
| 82 | 10 |
| 94 | 15 |

What is claimed is:

1. A television horizontal oscillator synchronizing arrangement for synchronizing a horizontal oscillator with a source of signals including horizontal synchronizing signals which may have a step change in phase occurring at the vertical deflection rate, comprising:

controllable oscillator means for producing horizontal rate signals, the frequency and phase of which are controllable;

horizontal deflection means coupled to an output of said controllable oscillator means and responsive to said horizontal rate signals for promoting the flow of horizontal deflection current in a deflection winding;

phase detecting means including a first input coupled to said horizontal deflection means and a second input coupled to the source of horizontal synchronizing signals and responsive to said deflection current and the horizontal synchronizing signals for producing control signals representative of the phase difference therebetween;

filter means coupled to an output of said phase detecting means and to an input of said oscillator means for producing an averaged signal for controlling said oscillator, said filter means having a variable frequency-amplitude characteristic;

a source of synchronizing signals at said vertical deflection rate;

vertical deflection means coupled to said source of vertical rate synchronizing signals for producing a recurrent ramp signal in synchronism with said vertical rate synchronizing signal; and threshold means coupled to said vertical deflection means and to said controllable filter means and responsive to a predetermined value of said recurrent ramp signal for varying said frequency-amplitude characteristic at a time delayed with respect to said vertical rate signals.

2. A synchronizing arrangement in accordance with claim 1 wherein said recurrent ramp signal is the deflection voltage.

3. A synchronizing arrangement according to claim 2 wherein said threshold means comprises:
   a reference voltage source, said reference voltage defining said particular value;
   comparator means having first and second inputs;
   first unidirectional current conducting means coupling said first input to said vertical deflection means for applying said deflection voltage to said first input;
   first resistance means coupling said second input of said comparator means to said vertical deflection means for applying said deflection voltage of said second input; and
   second unidirectional current conducting means coupled to said reference voltage source and to said second input for limiting the voltage applied to said second input of said comparator means to substantially said reference voltage.

4. A synchronizing arrangement according to claim 3 wherein said comparator means comprises a transistor having emitter and base electrodes corresponding to said first and second inputs of said comparator means, respectively.

5. A synchronizing arrangement according to claim 4 wherein the collector of said transistor is the output terminal of said comparator, and said collector is coupled to the frequency-amplitude control input of said controllable filter means.

6. A synchronizing arrangement according to claim 5 wherein said deflection voltage is a recurrent sawtooth voltage defining vertical scan and retrace intervals.

7. A synchronizing arrangement according to claim 6 wherein said emitter electrode is coupled to a reference potential by energy storage means.

8. A synchronizing arrangement according to claim 7 wherein said energy storage means is paralleled by resistance means, and wherein said energy storage means prevents switching of said transistor during said vertical retrace interval.

9. A synchronizing arrangement in accordance with claim 1 wherein said threshold means comprises a comparator and a reference signal source, and wherein said comparator compares said ramp signal with said reference signal.

10. A synchronizing arrangement in accordance with claim 9 wherein said comparator is responsive to crossings of said reference signal by said recurrent ramp signal for producing recurrent frequency-amplitude control signals for varying said frequency-amplitude characteristic.

11. A synchronizing arrangement according to claim 10 wherein said ramp signal is the vertical deflection voltage and said reference signal is a reference voltage.

12. A synchronizing arrangement according to claim 11 wherein said recurrent ramp signal is a sawtooth signal defining vertical scan and vertical retrace intervals.

13. A synchronizing arrangement according to claim 12 wherein said recurrent frequency-amplitude control signal is defined by first and second states.

14. A synchronizing arrangement according to claim 13 wherein said comparator compares said sawtooth signal with said reference voltage during said vertical scan interval and assumes a first of two states defining said recurrent frequency-amplitude control signal.

15. A synchronizing arrangement according to claim 14 wherein said comparator comprises energy storage means.

16. A synchronizing arrangement according to claim 15 wherein said energy storage means prevents said comparator from changing to said second state during said retrace interval.

* * * * *